July 20, 1965  J. CORWITH ETAL  3,195,595
HARVESTER FEED ELEMENT DRIVE ARRANGEMENT
Filed Aug. 3, 1962  2 Sheets-Sheet 1
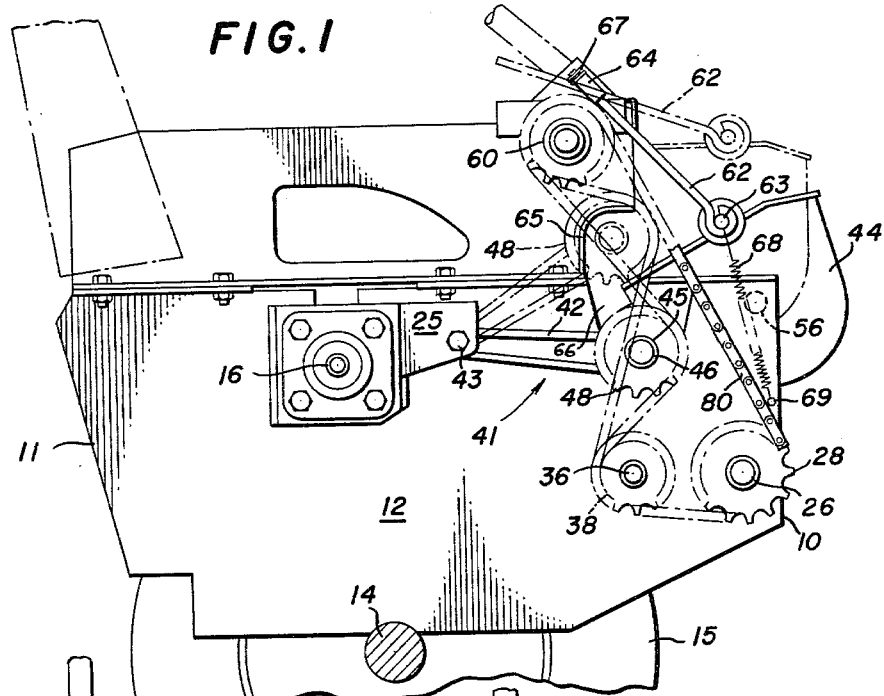
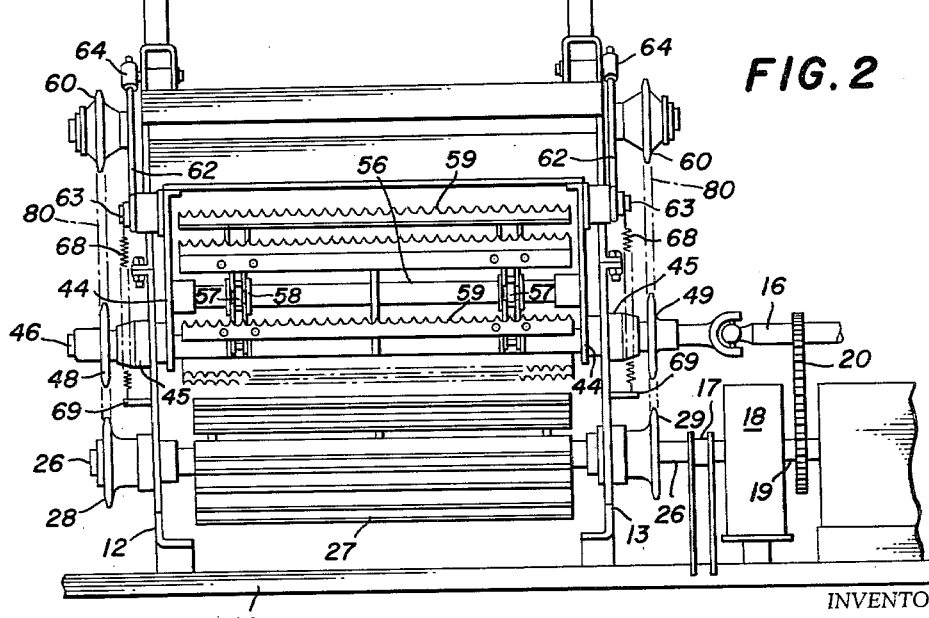
INVENTORS
JAMES CORWITH
WILBUR H. CLENDENIN
OWEN KOTH JR.
BY Paul O. Pipper
ATTY.

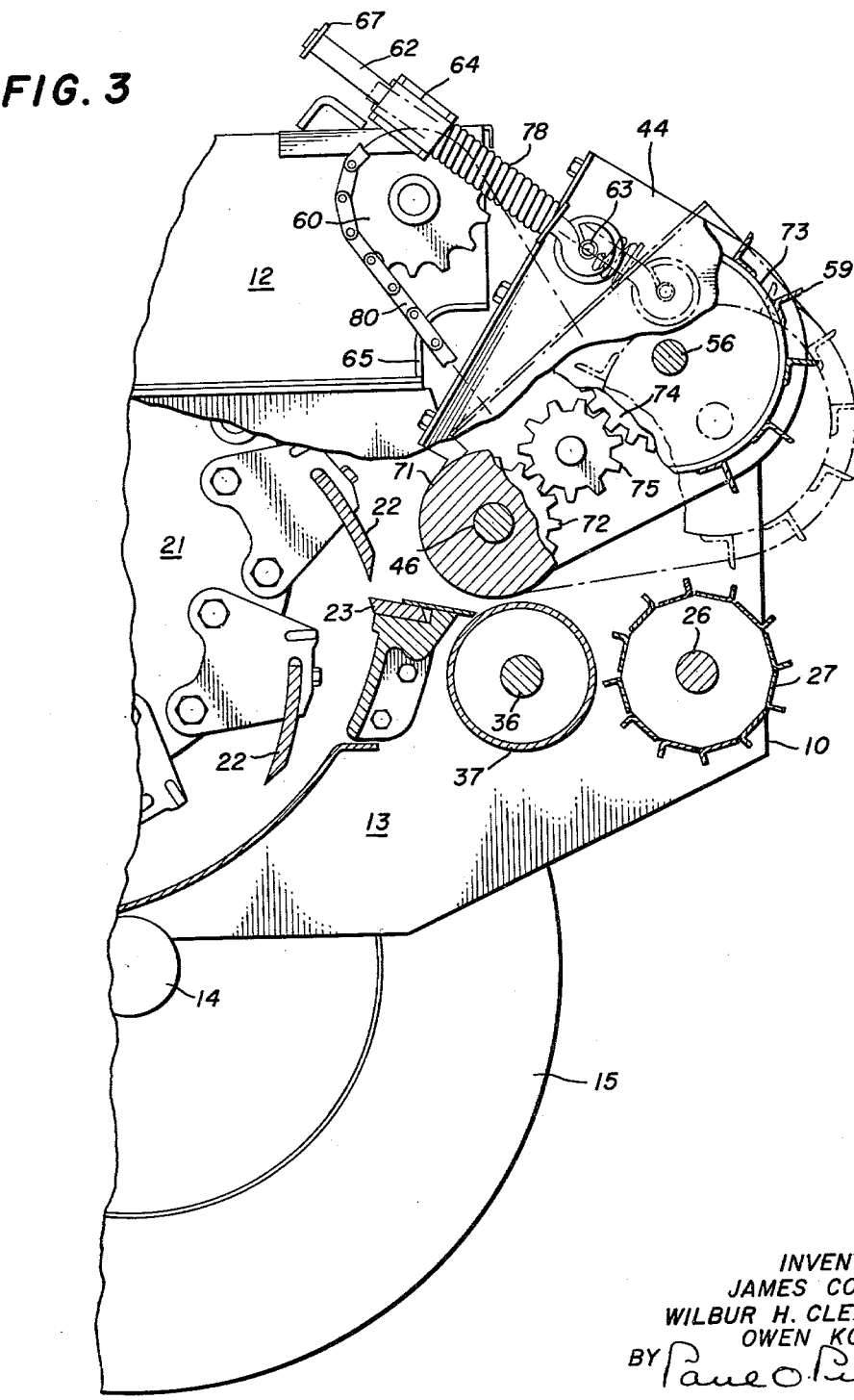

United States Patent Office 3,195,595
Patented July 20, 1965

3,195,595
HARVESTER FEED ELEMENT DRIVE
ARRANGEMENT
James Corwith, Naperville and Wilbur H. Clendenin, Downers Grove, Ill., and Owen Koth, Jr., Phoenix, Ariz., assignors to International Harvester Company, Chicago, Ill., a corporation of New Jersey
Filed Aug. 3, 1962, Ser. No. 214,658
9 Claims. (Cl. 146—120)

The present invention relates generally to harvesting machines and more particularly to new and improved drive arrangements for harvesting machines.

Those concerned with the development of harvesting machines have long recognized the need for a feed arrangement that can accommodate material of varying thicknesses and yet feed the material evenly across its entire width. The present invention fulfills this need. The general purpose of this invention is to provide a feeding mechanism which includes a pair of parallel driven shafts that can individually be raised or lowered in response to the thickness of the material and feed mechanisms carried by such shafts exerting a uniform feed on the material. To attain this, the present invention contemplates mounting the feeding mechanism on a pair of toggle joints and supplying the drive through the knee of the toggle joints.

Another advantage of the present invention is attained by driving both ends of all the feed shafts thus reducing the torsional stresses in the shafts and providing an even distribution of driving force along the shaft.

An object of the present invention is the provision of a harvesting machine having a driving mechanism that can accommodate material having varying thicknesses and yet exert an even driving force along the complete width of the driving members.

Another object is to provide a harvesting machine having a driving mechanism that will exert a compression force to the material that is substantially equal at both ends of the driving mechanism.

A further object of the invention is the provision of a driving mechanism that will exert an even driving force to the material and is adapted to accommodate material of varying thicknesses.

Still another object is to provide a driving mechanism having feed means that will exert an even driving force to the material across its entire width.

These and other objects of the invention will become more apparent from the specification and drawings wherein:

FIGURE 1 is a side elevation view of a harvesting machine incorporating the new drive arrangement;

FIGURE 2 is a front elevation view of the central portion of a harvesting unit with the new drive arrangement;

FIGURE 3 is a side elevation view of a harvesting machine including a second embodiment of the drive mechanism and having portions of the side of said harvesting machine cut away to better illustrate the drive mechanism and cutters.

Referring now to the drawings, wherein like reference characters designate like or corresponding parts throughout the several views, there is shown in FIGURE 1, which illustrates a preferred embodiment of the material feed mechanism, a harvesting machine having a front 10, a back 11, sides 12 and 13, an axle housing 14, and a pair of wheels 15, one of which is shown in FIGURE 1. Except for the material feed mechanism this is a conventional harvesting machine having a chopper shaft 16 carrying the chopper head 21 and moving blades 22 which cooperate with the stationary blade 23, as is illustrated in FIGURE 3 of the drawings. A preferred embodiment of the material feed mechanism has been shown in FIGURES 1 and 2 of the drawings.

As can best be seen in FIGURE 2, a lower front shaft 26 is journaled in the sides 12 and 13 of the harvesting machine and includes portions extending outwardly of each side 12 and 13. Lower front shaft 26 extends through an apertured post 17 and into the speed reducer 18 which includes an input shaft 19 driven by chain 20 which in turn is driven by the chopper shaft 16. A feed roll 27 is secured to shaft 26 between the sides 12 and 13. On the end portions of lower front shaft 26 are mounted sprocket wheels 28 and 29. A lower rear shaft 36 is also journaled in sides 12 and 13 rearwardly of the lower front shaft 26. On the end portions of lower rear shaft 36 extending through sides 12 and 13 are sprocket wheels 38 and 39. A mounting bracket 25 is secured to each of the sides 12 and 13 of the harvesting machine and the toggle joints 41 are pivotally mounted by pivot pins 43 on these mounting brackets. Each of the toggle joints 41 comprises a first bar 42 pivotally joined by a knee joint 45 to a second bar or plate 44. As previously stated, the free end of first bar 42 is pivotally mounted to the mounting bracket 25 by pivot pin 43. The pivot pins 43 on each side 12 and 13 of the harvesting machine are arranged such that they have a common axis. An upper rear shaft 46 extends through the knee joints 45 of the toggle joints 41 and connects the toggle joints together. The second bars or plates 44 of the toggle joints have journaled therein the upper front shaft 56 which connects the plates 44 of the two toggle joints together. Secured to the upper rear shaft 46, between the bars 42 of the toggle joint, are the apron drive wheels and, outwardly of bars 42, the sprocket wheels 48 and 49. Secured to the upper front shaft 56, between the second bars or plates 44, are apron drive wheels 57 which are connected to the apron drive wheels of the upper rear shaft by continuous chains 58. Secured to these continuous chains are material engaging slats 59 such as illustrated in FIGURE 2 having scalloped or other rough edges, forming a feed belt. As can be best visualized by considering FIGURE 1, the upper front shaft can be pivoted about the knee joint 45 of the toggle joint 41 and the upper rear shaft carried by the knee joints of the toggle joints can be pivoted about the pivot points 43. Thus an upper feed means has been provided that is connected to a harvesting machine about a single axis and includes a pair of parallel shafts that can be independently raised and lowered. The second bar or plate 44 is provided with a pivot pin 63 along its upper edge which carries a control rod 62, the upper end of which is received in a control rod pivot assembly 64, thus providing a guide means for the plate 44. Also mounted on the pivot pin 63 of the plate 44 is a spring 68, the opposite end of which is secured to a pin 69 which is mounted on the side 12 of the harvesting machine. These springs 68 along with the force of gravity exert downward force on the plate 44 which carries the upper front and rear shaft which in turn carry the upper feed means. The downward movement of the second bar 44 is limited at two points, the first being the engagement of the head of the control rods 62, such as a spring washer 67, with the control rod pivot assembly 64, and the second being the engagement of the upper rear shaft 46 with the edges of slots 66 formed in the sides 12 and 13. The second bar 44 is limited in its upward movement by engagement of the ring portion of the control rod 62 with the control rod pivot assembly 64 and also by the engagement of the upper rear shaft 46 with upper limit stop 65 formed in the sides 12 and 13. It should be noted that the first bars 42 and second bars 44 of the toggle joint 41 are offset slightly from each other such that the first bars lie outwardly of the sides 12 and 13 and the second bars are located between the sides 12 and 13, thus allowing the shaft of the knee joint to engage the upper and lower limits 65 and 66 formed in the sides 12 and 13.

A pair of idler sprocket wheels 60 are mounted on the upper portion of each of the sides 12 and 13. A continuous drive means 80 is provided for each of the sides and as can be best seen in FIGURE 1 engages sprocket wheels 38, 28 and 60 and the movable sprocket wheel 48. As the movable sprocket wheel 48 moves between its upper and lower limits it is continuously in driving engagement with the endless drive means 80.

Thus it is seen that an upper drive means comprising a belt drive element carried by shafts 46 and 56 has been provided that is free to be raised and lowered and to assume any desired attitude with the horizontal while being driven from both ends of shaft 46.

Referring now to FIGURE 3 wherein a second embodiment of the harvesting machine feed mechanism has been shown. This illustration also shows the relationship of the chopping head and cutting blades with relation to the feed means and other parts of the harvesting machine. In this embodiment the upper feed means comprises a pair of feed rolls rather than a feed belt. The upper rear feed roll 71 is driven in the same manner as was the upper rear shaft 46 of the embodiment disclosed in FIGURES 1 and 2 and transmits its rotary motion to the upper front feed rolls 73 by means of a pair of gears 72 mounted on the shaft 46 which engage a pair of idler gears 75 which are journaled on the second bar 44 and which in turn engage a pair of gears 74 mounted on the upper front shaft 56 which carries the upper front feed roll 73.

Another variation of the embodiment illustrated in FIGURES 1 and 2 that has been incorporated into the embodiment shown in FIGURE 3 is the provision of springs 78 mounted on the control rods 62. These springs 78 perform the same function as do the springs 68 illustrated in FIGURES 1 and 2. When the spring 78 is fully compressed by the upward motion of the feed roll 73 it becomes a solid member which pivots about trunnion 64. The maximum angularity of the upper feed elements, with respect to the lower feed elements, is reached when the spring 78 is fully compressed and feed roll 71 is stopped by the lower limit 66. This maximum angularity is selected at a point where material tends to be fed between the upper and lower feed elements rather than between rolls 71 and 73 of the upper feed element.

If feed roll 73 is elevated, when spring 78 is fully compressed, by pivoting about trunnion 64 the rear roll 71 will also be elevated. Such a result is inherent in the geometry of the toggle joint since when spring 78 is fully compressed the knee joint 46 is below a line through shafts 43 and 56. This simultaneous upward movement of both rolls 71 and 73 is stopped when the toggle joint is fully extended and shafts 43, 46 and 56 are aligned. This related movement of rolls 71 and 73 is advantageous since the rear feed roll is thereby positioned to receive the thick material that initially caused the front feed roll to rise. A further advantageous result of this feature is that material is less likely to feed between the rolls 71 and 73 since they tend to lie in a plane at a small angle to the plane of material travel.

When the toggle joint reaches the point where shafts 43, 46 and 56 are aligned the front feed roll 73 has reached its upper limit and raising the rear feed roll 71 at this point will cause a corresponding lowering of the front feed roll 73. This relationship is desirable since the front feed roll is repositioned to engage material of average thickness, after encountering a thick portion, as a result of both spring 78 and the geometry of the toggle linkage.

Thus it is seen that several embodiments of a freely movable upper feed means for a harvesting machine has been provided that can accommodate material of varying thicknesses and which because of its driving arrangement from both ends produces an evenly distributed driving force on the material and because of the unique driving arrangement can exert a greater force and yet use lighter material.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A material feeding mechanism comprising a frame structure; an underlying support mounted on said frame structure; conveying means overlying said underlying support comprising, a pair of toggle joints pivotally mounted at one end to said frame about a common axis, a first feed shaft carried by said pair of toggle joints on an axis extending through the knees of said toggle joints, a second feed shaft carried by said toggle joints on an axis extending through their free ends, drive means driving opposite ends of the first drive shaft for rotating and exerting a downward force thereon, means biasing said second feed shaft in the downward direction, rotary drive means connecting said first feed shaft to said second feed shaft, and material feed means carried by said first and second feed shafts.

2. The invention as set forth in claim 1 wherein said first feed shaft has a wheel secured thereto, and wherein said drive means includes a driven and an idler wheel mounted on said frame structure, and an endless driving means connecting said driven and idler wheels and engaging said first feed shaft wheel to rotate said feed shaft and exert a downward force thereon.

3. The invention as set forth in claim 1 wherein said first feed shaft has a wheel mounted on each end thereof; and wherein said drive means includes a pair of driven and a pair of idler wheels mounted on said frame structure, and a pair of endless belts each connecting a driven wheel to an idler wheel and each engaging one of said first feed shaft wheels to provide a rotary and downward force to each end of said first feed shaft.

4. In a harvesting machine of the type having a cylinder, chopping means within said cylinder and material handling means for feeding material into said cylinder, the improvement in said material handling means comprising: upper and lower shafts mounted on said machine, means mounting said upper shaft for movement on an axis eccentric of its axis of rotation toward and away with respect to the lower shaft, upper and lower feed means secured to respective shafts and defining a material passageway therebetween, and means for driving both ends of said upper shaft and oriented to impose a downward force upon the upper shaft in proportion to the volume of material passing between said feed means tending to lift said upper feed means, said means for driving comprising wheels on each end of each shaft and an endless drive element connecting the wheels at each end of each shaft, each element having a downwardly moving run having a rear side engaging the forward side of the wheel of the upper shaft and having a forward side wrapped about the rear side of the related wheel on the lower shaft.

5. In a harvesting machine of the type having a chopping chamber having an axis of rotation, chopping means within said chamber, and material handling means for feeding material into said chamber, the improvement in said material handling means including: conveying means mounted on the support and comprising a pair of toggle joints pivotally mounted at one end to said machine about a common axis adjacent to said axis of the chopping means in an area inwardly of its periphery, a first feed shaft carried by said pair of toggle joints on an axis extending through the knees of said toggle joints, a second feed shaft carried by said toggle joints on an axis extending through their free ends, drive means drivingly connected to opposite ends of said first feed shaft for rotating and exerting a downward force thereon, means biasing said second feed shaft in the downward direction, first and second feed rollers beneath said conveying means, rotary drive means connecting said first feed roller to said second feed roller, and material feed means carried by said first and second shafts.

6. The invention as set forth in claim 5 wherein said first feed shaft has a sprocket secured thereto, and wherein said drive means includes a driven and an idler sprockets mounted on said frame structure, and an endless chain connecting said driven and idler sprockets and drivingly engaging said first feed shaft sprocket to rotate said feed shaft in a direction exerting a downward force thereon.

7. The invention as set forth in claim 5 wherein said first feed shaft has a sprocket mounted on each end thereof; and wherein said drive means includes a pair of driven and a pair of idler sprockets mounted on said frame structure, and a pair of endless chains each connecting a driven sprocket to an idler sprocket and each engaging one of said first feed shaft sprockets and having a driving orientation to provide a rotary and downward force to each end of said first feed shaft.

8. In a harvesting machine having a front, a rear, and spaced interconnecting vertical sides, material handling means including front and rear lower shafts journaled in said vertical sides and including end portions extending through said sides, feed rollers secured to said front and rear lower shafts between said sides, a toggle joint pivotally mounted at one end on each side of said machine about a common axis rearwardly of said rear shaft, an upper rear shaft journaled in and connecting the knees of said toggle joints and having end portions extending through said knees and disposed forwardly of said axis, a feed roller secured to said upper rear shaft between said knees, an upper front shaft having a feed roll secured thereto journaled in and connecting the free ends of said toggle joints, an idler mounted on each of said sides above said common axis, drive transmission means mounted on said end portions of the front and rear lower shafts and the upper rear shaft in alignment with said idler, an endless drive means on each side of the machine connecting the respective drive transmitting means of said lower shafts and idler in driving relationship to the drive transmitting means of said upper rear shaft, means for transmitting rotary motion in the same direction from said upper rear shaft to said upper front shaft, means biasing the free ends of said toggle joints downwardly, and rotary drive means for a lower shaft and adapted to rotate said feed rolls such that material will be fed from the front of the harvesting machine to the rear.

9. In a harvesting machine having a front, a rear, and spaced interconnecting vertical sides; material handling means including front and rear lower shafts journaled in said vertical sides and extending through said sides, feed rollers secured to said front and rear lower shafts between said sides, a toggle joint pivotally mounted at one end on each side of said machine about a common axis, an upper rear shaft journaled in and connecting the knees of said toggle joints and having end portions extending through said knees, apron drive means secured to said upper rear shaft between said knees; an upper front shaft having apron drive means secured thereto journaled in and connecting the free ends of said toggle joints; an endless material engaging apron mounted on said upper front and rear shafts; an idler mounted on each of said sides above said common axis, wheels mounted on said end portions of the front and rear shafts and the upper rear shaft in alignment with said idler, an endless drive means on each side of the machine connecting the wheels of said lower shafts and said idler in driving relationship to the wheels of said upper rear shaft, means biasing the free ends of said toggle joints downwardly, and rotary drive means for a lower shaft to drive said feed rolls such that material will be fed from the front of the harvesting machine to the rear.

References Cited by the Examiner
UNITED STATES PATENTS

| 886,223 | 4/08 | Krase et al. | 146—118 |
| 1,093,763 | 4/14 | Brown | 198—167 |
| 2,629,978 | 3/53 | Krause et al. | 198—167 X |

J. SPENCER OVERHOLSER, *Primary Examiner.*